(12) United States Patent
Warner et al.

(10) Patent No.: US 8,539,164 B2
(45) Date of Patent: Sep. 17, 2013

(54) CACHE COHERENCY WITHIN MULTIPROCESSOR COMPUTER SYSTEM

(75) Inventors: Craig Warner, Addison, TX (US); Gary Gostin, Plano, TX (US); Dan Robinson, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1026 days.

(21) Appl. No.: 12/244,700

(22) Filed: Oct. 2, 2008

(65) Prior Publication Data
US 2009/0094418 A1 Apr. 9, 2009

Related U.S. Application Data

(63) Continuation-in-part of application No. 11/741,858, filed on Apr. 30, 2007.

(51) Int. Cl.
*G06F 13/00* (2006.01)

(52) U.S. Cl.
USPC .................................. 711/141; 711/E12.037

(58) Field of Classification Search
None
See application file for complete search history.

(56) References Cited

U.S. PATENT DOCUMENTS

| | | | | |
|---|---|---|---|---|
| 6,345,338 B1 * | 2/2002 | Mililo et al. | ................. | 711/137 |
| 6,457,104 B1 * | 9/2002 | Tremaine et al. | ............ | 711/133 |
| 6,662,277 B2 * | 12/2003 | Gaither | ........................ | 711/145 |
| 6,684,305 B1 * | 1/2004 | Deneau | ......................... | 711/159 |
| 6,868,481 B1 * | 3/2005 | Gaither et al. | ................ | 711/119 |
| 7,310,708 B2 * | 12/2007 | Gaither | ........................ | 711/141 |
| 7,373,457 B2 * | 5/2008 | Gaither et al. | ................ | 711/119 |
| 7,930,697 B2 * | 4/2011 | Mckean et al. | ............... | 718/100 |
| 8,131,941 B2 | 3/2012 | Kinter | | |
| 2002/0046321 A1 * | 4/2002 | Kanai et al. | ................... | 711/113 |
| 2002/0144063 A1 * | 10/2002 | Peir et al. | ...................... | 711/141 |
| 2007/0061520 A1 * | 3/2007 | Jones et al. | ................... | 711/146 |

* cited by examiner

*Primary Examiner* — Edward Dudek, Jr.
*Assistant Examiner* — Sean D Rossiter

(57) ABSTRACT

An embodiment of a multiprocessor computer system comprises main memory, a remote processor capable of accessing the main memory, a remote cache device operative to store accesses by said remote processor to said main memory, and a filter tag cache device associated with the main memory. The filter cache device is operative to store information relating to remote ownership of data in the main memory including ownership by the remote processor. The filter cache device is operative to selectively invalidate filter tag cache entries when space is required in the filter tag cache device for new cache entries. The remote cache device is responsive to events indicating that a cache entry has low value to the remote processor to send a hint to the filter tag cache device. The filter tag cache device is responsive to a hint in selecting a filter tag cache entry to invalidate.

20 Claims, 4 Drawing Sheets

CACHE COHERENCY WITHIN MULTIPROCESSOR COMPUTER SYSTEM

CROSS-REFERENCE TO RELATED APPLICATIONS

This application is a continuation in part of U.S. patent application Ser. No. 11/741,858, filed Apr. 30, 2007 in the name of Christopher Greer, et al., which is incorporated herein by reference in its entirety.

STATEMENT REGARDING FEDERALLY SPONSORED RESEARCH OR DEVELOPMENT

FIELD OF THE INVENTION

The present invention relates to computer systems, and more particularly relates to systems and methods for achieving cache coherency within multiprocessor computer systems.

BACKGROUND OF THE INVENTION

To achieve greater processing power, many computer systems now are multiprocessor computer systems that can be scaled to large sizes by adding greater and greater numbers of processors. Such multiprocessor computer systems also typically are designed such that the memory of the computer systems is also allocated to the various processors, which control access to the respective memory blocks with which the processors are respectively associated.

To allow all of the processors of the multiprocessor computer systems to access all of the different memory blocks that are allocated to the various processors and at the same time prevent the occurrence of circumstances in which the accessing of a given memory location by one processor conflicts with the accessing of that memory location by another processor, such computer systems typically employ cache coherency protocols by which the status of the various memory locations is tracked and conflicts are avoided.

Many conventional multiprocessor computer systems employ processors that interact with the memory allocated to those processors by way of a separate memory control device. In at least some such systems, "in main memory" directory-based cache coherency protocols are employed in order to scale the systems. Yet the efficacy of such cache coherency protocols are not easily implemented on computer systems in which the memory controllers are fully integrated (e.g., on a single socket or chip) with the processors controlling those memory controllers, since in such systems the memory controllers can employ protocols that are limited in their scalability.

DETAILED DESCRIPTION OF THE PREFERRED EMBODIMENT

Figure 1:
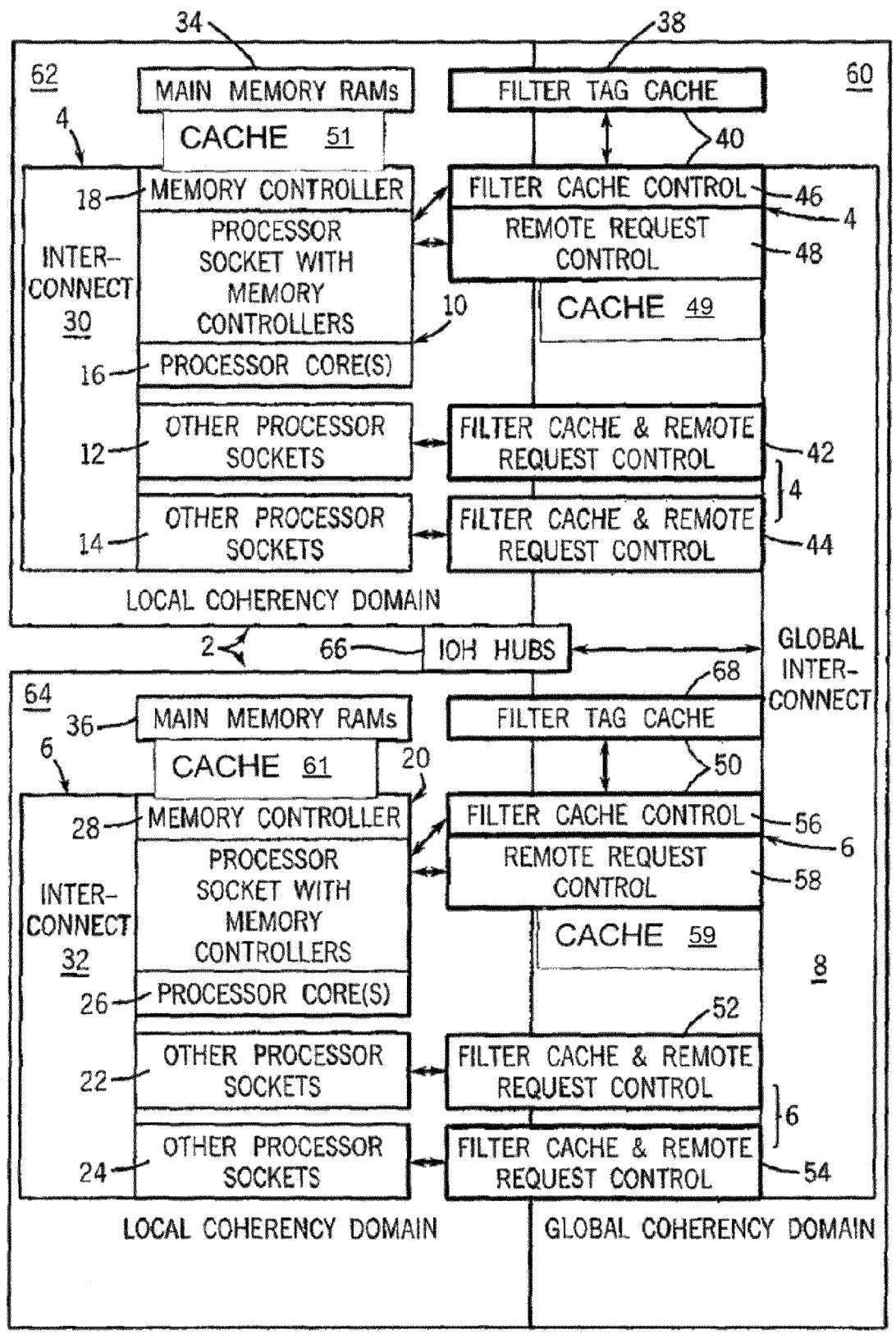
FIG. 1 is a schematic diagram showing exemplary components of a computer system having multiple cells that are in communication with one another, in accordance with one embodiment of the present invention.

Referring to FIG. 1, components of an exemplary multiprocessor computer system 1 in accordance with at least one embodiment of the present invention are shown in a simplified schematic form. As shown, the computer system 1 includes a partition 2 having two field replaceable units (FRUs) or "cells", namely, a first cell 4, a second cell 6, and a fabric 8 to facilitate communication between those two cells. The two cells 4, 6 can be understood to be formed on two separate printed circuit boards that can be plugged into, and connected by, a backplane (on which is formed or to which is coupled the fabric 8). Although the computer system 1 of the present embodiment includes only the single partition 2 having the first and second cells 4 and 6, it is nevertheless intended to be representative of a wide variety of computer systems having arbitrary numbers of partitions with arbitrary numbers of cells and/or circuit boards. For example, in other embodiments, multiple partitions, each having a single cell or possibly more than two cells, can be present and coupled with one another by way of the fabric 8. Also for example, the second cell 6 can alternatively be representative of multiple cells.

In at least some embodiments, the computer system 1 is a sx1000 super scalable processor chipset available from the Hewlett-Packard Company of Palo Alto, Calif., on which are deployed hard partitions (also known as "nPars") on one (or more) of which exist the cells 4, 6. Hard partitions allow the resources of a single server to be divided among many enterprise workloads and to provide different operating environments (e.g., HP-UX, Linux, Microsoft Windows Server 2003, OpenVMS) simultaneously. Such hard partitions also allow computer resources to be dynamically reallocated. Although the computer system 1 can be the super scalable processor chipset mentioned above, it need not be such a chipset and instead in other embodiments can also take a variety of other forms.

Each of the cells 4, 6 is capable of supporting a wide variety of hardware and software components. More particularly as shown, each of the cells 4, 6 in the present embodiment includes multiple sockets on which are implemented multiple processors as well as memory controllers. For example, the first cell 4 includes first, second and third sockets 10, 12 and 14, respectively. The first socket 10 in particular includes processors 16 as well as a memory controller 18. Although not shown in detail, the other sockets 12, 14 can also be understood to include both processors and one or more memory controllers. Similarly, the second cell 6 includes first, second and third sockets 20, 22 and 24, respectively, where the first socket 20 include processors 26 as well as a memory controller 28 and the other sockets also include processors and one or more memory controllers. Further as shown, the respective sockets of each of the cells 4, 6 are coupled to one another by a respective interconnection device. That is, the sockets 10, 12 and 14 of the first cell 4 are coupled to and capable of communications with one another by way of an interconnection device 30, while the sockets 20, 22 and 24 of the second cell 6 are coupled to and capable of communications with one another by way of an interconnection device 32.

The respective processors of the sockets 10, 12, 14, 20, 22, 24, which can be referred to alternatively as cores or central processing units (CPUs), typically are formed on chips that are coupled by way of electrical connectors to the respective circuit boards corresponding to the respective cells 4, 6. Although the processors (e.g., the processors 16, 26) are intended to be representative of a wide variety of processing devices, in the present embodiment, the processors are Itanium processing units as are available from the Intel Corporation of Santa Clara, Calif. In other embodiments, one or more of the processors can take other forms including, for example, Xeon and Celeron also from the Intel Corporation. In alternate embodiments, one or more of the processors can be another type of processor other than those mentioned above. The various processors on a given cell (or on a given socket), and/or on different cells need not be the same but rather can differ from one another in terms of their types, models, or functional characteristics. Also, although the present embodiment shows the cells 4, 6 each as having multiple processors, it is also possible for a given cell to have only a single processor.

Further as shown, the respective memory controllers 18 and 28 of the respective sockets 10 and 20 are in communication with respective memory blocks 34 and 36. Although only the memory blocks 34 and 36 that are respectively in communication with the sockets 10 and 20 are shown in FIG. 1, it should be understood that additional memory blocks (not shown) are respectively in communication with the other sockets 12, 14, 22, and 24. That is, typically there are respective memory blocks that are allocated to each of the respective processor sockets, albeit in some embodiments it is possible that certain sockets will not have any memory blocks or that two or more sockets will all have access to, and share, a given block of memory.

The memory blocks 34, 36 can take a variety of different forms depending upon the embodiment. For example, in one embodiment of the present invention, the memory blocks 34, 36 can each include a main memory formed from conventional random access memory (RAM) devices such as dynamic random access memory (DRAM) devices. In other embodiments, the memory blocks 34, 36 can be divided into multiple memory segments organized as dual in-line memory modules (DIMMs). In alternate embodiments, the memory blocks 34, 36 can be formed from static random access memory (SRAM) devices such as cache memory, either as a single level cache memory or as a multilevel cache memory having a cache hierarchy. In further embodiments, the memory blocks 34, 36 can be formed from other types of memory devices, such as memory provided on floppy disk drives, tapes and hard disk drives or other storage devices that can be coupled to the computer system 1 of FIG. 1 either directly or indirectly (e.g., by way of a wired or wireless network), or alternatively can include any combination of one or more of the above-mentioned types of memory devices, and/or other devices as well.

In the present embodiment, each of the cells 4, 6 also includes a plurality of agents or processor interfaces that are respectively coupled to and in communication with the respective sockets of the respective cells. More particularly as shown, the first cell 4 includes first, second and third processor interfaces 40, 42 and 44, respectively, that are coupled to and in communication with the first, second and third sockets 10, 12 and 14, respectively. Also, the second cell includes first, second and third processor interfaces 50, 52 and 54, respectively, that are coupled to and in communication with the first, second and third sockets 20, 22 and 24, respectively.

Additionally, as will be described further in relation to FIG. 2, each of the processor interfaces 40, 42, 44, 50, 52 and 54 in the present embodiment includes certain internal components. For example, the first processor interface 40 of the first cell 4 includes a filter tag cache 38, and a node controller comprising a filter cache control block 46 and a remote request control block 48 and cache 49, while the first processor interface 50 of the second cell 4 includes a filter tag cache 68, a filter cache control block 56 and a remote request control block 58 and cache 59. The processor interfaces 42, 44, 52, and 54 may have a similar internal structure.

As will be explained in more detail below, the filter tag cache 38, the filter cache control 46, and the cache 48 cooperate to form a filter cache device when the processor socket 10 is acting as a host, permitting other cells to access its main memory RAMs 34. The cache 49 acts as a client cache, or as a highest level client cache cooperating with lower level cache 51 in the processor socket 10, when the processor socket 10 is acting as a host, using data from the main memory RAMs of other cells 6. Likewise, the cache 59 acts as a client cache, or as a highest level client cache cooperating with lower level cache 61 in the processor socket 20, when the processor socket 20 is acting as a host, using data from the main memory RAMs of other cells 4. In general, the "highest level cache" in a multi-level cache is the cache furthest from the client processor, typically the largest, slowest cache. The highest level cache typically contains data that has been evicted from lower levels of cache with smaller capacity.

The processor interfaces 40-44 and 50-54, and particularly the remote request control blocks (e.g., the blocks 48 and 58) of those processor interfaces serve as intermediaries between the fabric 8 and the remaining portions of the cells 4, 6, particularly the sockets 10-14 and 20-24. Further, the filter cache control blocks of the respective cells 4, 6 allow for communication between the respective processor interfaces 40-44 and 50-54 and respective filter tag caches 38, 68 (which can also be referred to as "RTAGs") of the first and second cells. The filter tag caches 38, 68, which in at least some embodiments can be formed as on-chip static random access memory (SRAM) devices, can also be considered as forming parts of the respective cells 4, 6. Although only the filter tag caches 38, 68 are shown in FIG. 1 to be respectively coupled to the processor interfaces 40 and 50, respectively, it should be understood that each of the processor interfaces 40-44 and 50-54 has its own filter tag cache with which it is coupled (that is, each of the cells 4, 6 actually includes three filter tag caches even though only one such filter tag cache is shown in FIG. 1). Also, while the filter tag caches 38, 68 are shown to be distinct from (albeit coupled to) the filter cache control blocks 46, 56 and the remote request control blocks 48, 58 in the present embodiment, in alternate embodiments the filter tag caches could be incorporated into the respective filter cache control blocks 46, 56 and remote request control blocks 48, 58 as parts thereof.

With respect to the fabric 8, it is a hardware device that can be formed as part of (or connected to) the backplane of the computer system 1, and can take the form of one or more crossbar devices or similar chips. The cells 4, 6 are connected to the fabric 8 during configuration when those cells are installed on the partition 2 within the computer system 1. The fabric 8 serves as a global intermediary for communications among the various resources of the computer system 1 during operation of the computer system, including resources associated with different partitions (not shown) of the computer system. In order for signals provided to the fabric 8 to be properly communicated via the fabric to their intended destinations, in the present embodiment, the signals must take on virtualized fabric (or global) addresses that differ from the physical addresses employed by the signals when outside of the fabric. Additionally as shown, the fabric 8 is also coupled to one or more input/output hubs (IOHs) 66 that represent one or more input/output (I/O) devices. By virtue of the fabric 8 these I/O devices also can attempt to access memory blocks such as the memory blocks 34, 36 that are associated with the various cells 4, 6.

In the present exemplary embodiment of FIG. 1, the computer system 1 is a multiprocessor computer system formed by way of socket-chips that each have not only one or more processors on the respective chips but also have one or more memory controllers on the respective chips, albeit the memory devices (e.g., the memory blocks 34, 36) are not part of the respective chips. The particular configuration and architecture of the computer system 1 shown in FIG. 1, with the processor interfaces 40-44, 50-54 and the fabric 8, is designed to facilitate the operation of such a multiprocessor computer system. The processor interfaces and fabric in particular provide an exemplary "home agent" filter cache architecture in which multiple local cache coherency domains are bridged together using a global coherency domain so that a scalable, shared memory multiprocessor system can be built using microprocessors with "on-chip" memory controllers. Systems adopting this architecture can scale to larger numbers of processors than the number supported natively by the processor socket and its own memory controller as in conventional systems.

More particularly in the example of FIG. 1, a first local coherency domain 62 encompassing the first cell 4 (including the sockets 10-16, interconnection device 30, processor interfaces 40-44, and filter tag cache 38) is bridged in relation to a second local coherency domain 64 encompassing the second cell 6 (including the sockets 20-26, interconnection device 32, processor interfaces 50-54, and filter tag cache 68) by way of the processor interfaces and the fabric 8. Although the present example shows only the two local coherency domains 62 and 64, it should be further understood that the present architecture is generally expandable to any arbitrary number of local coherency domains, cells, sockets, processors, etc. To support protocol bridging, all of main memory of the computer system (e.g., the memory blocks 34 and 36) is divided among the filter tag caches of the system.

The manner in which cache coherency among these coherency domains is established and maintained is explained below in detail with respect to FIG. 2. Generally speaking, each filter tag cache is assigned responsibility for the memory controlled by the processor socket to which it is connected, and can be considered the "home agent" filter tag cache for that memory. More particularly, the home agent filter tag cache for any given memory portion is responsible for tracking remote cache line ownership and storing cache line ownership information for all remotely-owned cache lines pertaining to its associated region of memory. For example, the filter tag cache 38 is responsible for the tracking remote cache line ownership in relation to the memory block 34, while the filter tag cache 68 is responsible for tracking remote cache line ownership in relation to the memory block 36. This ownership information allows the processor interfaces 40-44, 50-54 to handle remote requests received off of the fabric 8 (e.g., a request received by the processor interface 40 from the cell 6), as well as to properly direct snoops arising from the processor sockets with which the processor interfaces are respectively associated in accordance with their respective local cache coherency protocols (e.g., a snoop received at the processor interface 40 from the socket 10 and intended for the cell 6).

Further for example, in response to receiving remote read requests off of the fabric, the processor interfaces know whether to forward the read requests to the memory controllers of the sockets with which the processor interfaces are associated, or alternatively to issue snoops to remote owners. Additionally, in response to receiving remote write requests off of the fabric, the processor interfaces can sanity check writeback and exclusive eviction requests to make sure writes are coming from an authorized remote owner. Also, for snoops issued from a local coherency domain's cache coherency protocol, the respective processor interface associated with that local coherency domain can determine which remote owner should be snooped even though the local coherency domain's cache coherency protocol is only capable of specifying that the cache line of interest is owned by an indeterminate remote owner. If a cache line is owned only by a processor in the local coherency domain with which a processor interface is affiliated, the processor interface will not track ownership of the cache line and does not need to be consulted for requests. This enables the lowest possible cache miss latency for cache coherency requests that stay entirely in the local coherency domain.

Figure 2:
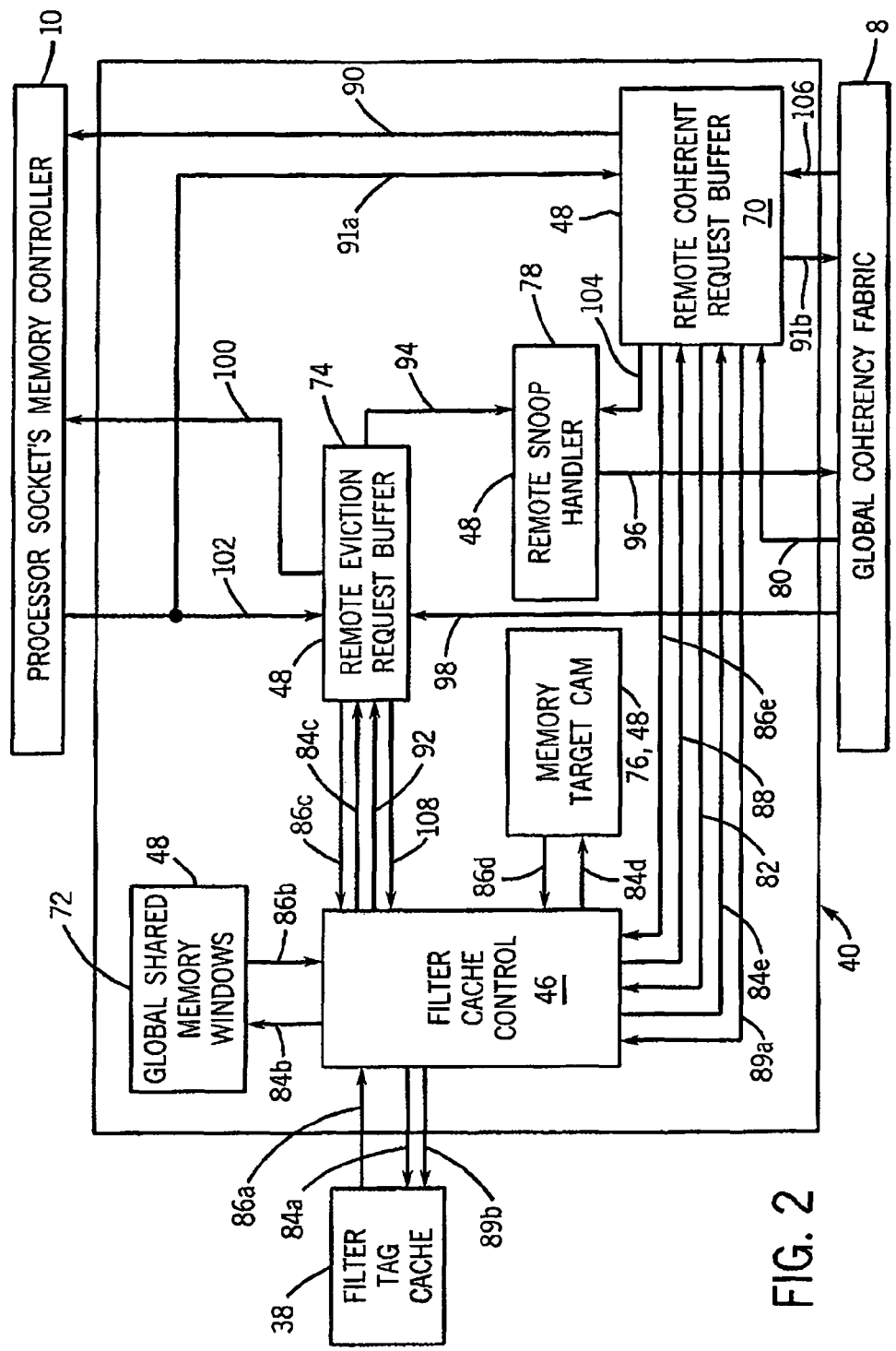
FIG. 2 is an additional schematic diagram showing in more detail certain of the components of FIG. 1 as well as exemplary signal flows among and within those components, in accordance with one embodiment of the present invention.

Turning then to FIG. 2, portions of the computer system 2 are shown in more detail along with exemplary signals that are communicated within the computer system in response to an exemplary remote cache line request. More particularly, the processor interface 40 of the cell 4 is shown to be in communication with each of its associated filter tag cache 38, its associated socket 10 and the fabric 8. Further, the processor interface 40 is shown to include, in addition to the filter cache control block 46, several internal components that together form the remote request control block 48 of FIG. 1, namely, a remote coherent request buffer block 70, a global shared memory windows block 72, a remote eviction request buffer block 74, a memory target content addressable memory (CAM) block 76, and a remote snoop handler block 78. The blocks 70-78 are hardware components typically formed in an agent application specific integrated circuit (ASIC) chip that perform specific functions as described in further detail below.

The internal components 70-78, 46 of the processor interface 40 interact with one another and in relation to the filter tag cache 38, the socket 10 and the fabric 8 in response to remote cache line requests received from other sockets, particularly sockets associated with cells other than the cell 4 on which is located the socket 10. One such remote cache line request can be, for example, a read request received from one of the processors of the socket 20 of the cell 6 via the fabric 8. Such a remote cache line request can be handled by the processor interface 40 as follows. Upon receipt of the remote cache line request at the fabric 8, a corresponding signal 80 is in turn communicated to the remote coherent request buffer block 70 of the processor interface 40 (and, more particularly, of the remote request control block 48). As indicated above, the signal received from the fabric 8 includes a virtualized address rather than an actual, physical address, so as to allow transmission of the signal over the fabric. Upon receiving the signal 80, the remote coherent request buffer block 70 precipitates a tag lookup for the transaction by sending a further signal 82 to the filter cache control block 46.

Subsequently, the filter cache control block 46 sends in a substantially simultaneous manner five signals 84*a*, 84*b*, 84*c*, 84*d* and 84*e*, respectively, to five different locations. More particularly, the filter cache control block 46 sends the signal 84*a* to the filter tag cache 38, which results in a read being performed at that cache (e.g., an SRAM read) in order to obtain the tag lookup requested by the remote coherent request buffer block 70. Further, the filter cache control block 46 also sends the signals 84*c* and 84*e*, respectively, to the remote eviction request buffer 74 and back to the remote coherent request buffer 70, in response to which an address cache coherency conflict check is performed. This conflict check in particular is performed to determine whether another request is currently being handled that pertains to the same cache line location as the presently-received remote cache line request. More particularly, the present architecture implements a multi-stage pipeline to perform conflict detection so only one request is allowed to alter the coherency state for a given cache line at a time. This is accomplished by CAMMing other outstanding remote requests, outstanding locally initiated snoop requests, and outstanding filter cache eviction requests Additionally, the signal 84*d* is sent by the filter cache control block 46 to the memory target CAM block 76 so as to gather information regarding attributes of the memory block/segment being accessed as well as, in some cases, to determine whether a requested memory type is not available. The memory target CAM block 76 also (along with possibly additional assistance from another address conversion block, which is not shown) serves to convert the virtualized fabric address into a physical address appropriate for contacting the requested cache line. As for the signal 84*b*, that signal is sent by the filter cache control block 46 to the global shared memory windows block 72 so as to check in this sequence for coherent request(s) made from outside the partition 2 or local coherency domain (e.g., to perform a remote partition access check, where remote partition accesses can be either granted or denied). The global shared memory windows block 72 also serves to keep track of which memory segments have been opened up or made available to multiple partitions, and keeps track of which partitions have access to the various memory segments.

Once the filter tag cache 38, global shared memory windows block 72, remote eviction request buffer block 74, memory target CAM block 76 and remote coherent request buffer block 70 have acted in response to the respective signals 84*a*, 84*b*, 84*c*, 84*d* and 84*e*, respectively, those components send responsive signals back to the filter cache control block 46 as represented by further signals 86*a*, 86*b*, 86*c*, 86*d*, and 86*e*, respectively. The information provided by the respective signals 86*a*-86*e* can depend upon what is determined by the filter tag cache 38 and the blocks 70-76.

Assuming that the desired filter tag is not present at the filter tag cache 38 (e.g., the cache line is not currently owned and so there is a cache miss), and assuming that no conflicts are present (as determined by the remote eviction request buffer block 74 and the remote coherent request buffer block 70), then the filter cache control block 46 in turn sends a further signal 88 back to the remote coherent request buffer block 70 indicating the filter tag cache directory state and a physical address for the remote cache line request. The remote coherent request buffer 70 in turn sends a signal 90 to the memory controller 18 corresponding to the processor interface 40, in response to which the appropriate accessing (in this case, reading) of the appropriate segment of the memory block 34 is able to occur using the physical address information. The accessed information is subsequently provided back to remote coherent request buffer block 70 as indicated by a signal 91*a*, and then further forwarded by that block to the processor/socket of the cell 6 that initiated the remote cache line request as indicated by a signal 91*b*. Additionally, the remote coherent request buffer block 70 also sends a further signal 89*a* to the filter cache control block 46 notifying it of the new owner of the requested cache line, and the filter cache control block in turn sends a signal 89*b* to the filter tag cache 38 updating that cache with the ownership information.

The above description in particular envisions operation by the filter tag cache 38 that is "inclusive". That is to say, if there is a cache miss, then this is guaranteed to indicate that no processor (or other entity) within the computer system 2 has remote ownership of the requested cache line. However, in alternate embodiments, it also possible that one or more of the filter tag caches such as the filter tag cache 38 are "non-inclusive". In such embodiments, even if there is a cache miss with respect to a given filter tag cache, it is still possible that some remote entity has ownership of the requested cache line (for example, where there is the possibility of shared ownership of cache lines, in which case the filter tag cache is non-inclusive for shared lines). Consequently, when a cache miss occurs, in such embodiments a broadcast snoop is then executed with respect to the entire computer system 2 (e.g., everything connected to the fabric 8), such that all entities are notified that they must give up ownership of the requested cache line to the extent that they have ownership of that cache line. This broadcast snoop is to be contrasted with a targeted snoop as discussed further below.

Notwithstanding the above discussion regarding circumstances in which there is a "cache miss", in other circumstances further actions must be taken before access to the requested memory block segment can be granted in response to the remote cache line request. More particularly, in contrast to the above-described circumstance, sometimes upon receiving the signal 84*a* the filter tag cache 38 recognizes that the requested cache line is already owned by another entity, for example, one of the processors of the socket 22 of the cell 6. In that case, the filter tag cache 38 provides the ownership information in the signal 86*a*, and this information then is returned to the remote coherent request buffer block 70 in the signal 88. When this occurs, the remote coherent request buffer block 70 in turn sends a snoop request signal 104 to the remote snoop handler 78, which then sends a snoop signal 96 via the fabric 8 to the current owner of the requested cache line (again, for example, a processor of the socket 22).

In response to this action, the current owner invalidates its corresponding cache line (assuming it is not already invalid) and further sends a signal 106 back to the remote coherent request buffer block 70 via the fabric 8 indicating that the current owner has given up its ownership of the requested cache line, and communicating the current information stored by the current owner in relation to that cache line. After this occurs, the remote coherent request buffer block 70 sends the signal 89*a* to the filter cache control block 46, which in turn sends the signal 89*b* to the filter tag cache 38, and thereby updates the filter tag cache with the updated ownership information concerning the requested cache line. Also at this time, the remote coherent request buffer block 70 sends the signal 91*b* via the fabric 8, to the remote entity that requested the cache line (e.g., a processor on the socket 20), the data received from the original owner of the cache line, which constitutes the most recently-updated data for the cache line. However, no communication occurs at this time between the remote coherent request buffer block 70 and the memory controller 18 in order to obtain the information stored at the cache line in the memory controller (e.g., neither of the signals 90 or 91*a* occurs), since that information is stale information relative to the information that was provided from the original owner of the cache line by way of the signal 106.

In still other operational circumstances, it is possible that upon the receiving of a remote cache line request at the remote coherent request buffer block 70, and subsequent communication of the signals 82 and 84*a* to the filter cache control block 46 and the filter tag cache 38, respectively, it will be determined by the filter tag cache that it does not have sufficient room to store new cache line ownership information. That is, it may be the case that the filter tag cache 38 is sufficiently full of cache line entries that it does not have room to store new information corresponding to a reassignment of the requested cache line in response to the remote cache line request. If this is the case, a previously active way in the filter tag cache 38 can be used as a replacement. To achieve this, the signal 86a returned from the filter tag cache 38 indicates that the cache is currently full and additionally indicates an appropriate cache line that should be replaced. The filter cache control block 46 upon receiving the signal 86a from the filter tag cache 38 in turn sends an eviction request signal 92 to the remote eviction request buffer block 74 in addition to providing the signal 88 to the remote coherent request buffer block 70. In response to the signal 92, the remote eviction request buffer block 74 sends a further eviction snoop request signal 94 to the remote snoop handler block 78, which then issues an appropriate (targeted) snoop signal 96 to the fabric 8.

The snoop signal 96 by way of the fabric 8 eventually reaches the owner of the cache line indicated by the filter tag cache 38 (in the signal 86a) as being the cache line that should be replaced. For example, the owner can be one of the processors associated with the socket 24 of the cell 6. Upon receiving the snoop signal 96, the owner invalidates its cache line entry, and subsequently an eviction snoop response signal 98 is returned by that owner via the fabric 8 to the remote eviction request buffer block 74. Once this occurs, the remote eviction request buffer block 74 in turn sends a signal 100 to the socket 10 with which the processor interface 40 is associated, thus causing that socket to give up the ownership line. When that is accomplished, a further signal 102 is provided back from the socket 10 to the remote eviction request buffer 74, which in turn provides a signal 108 to the filter cache control block 46 indicating that the filter tag cache can be updated with the new cache line ownership information in place of the evicted cache line information. The filter cache control block 46 then sends a signal to the filter tag cache 38 (e.g., the signal 89b) to update that cache. It should be further noted that the remote coherent request buffer block 70 is unaware of the above-described eviction process.

Although the above discussion presumes that cache line requests to a processor interface come from remote devices (e.g., from different cells and/or different local coherency domains), it should further be noted that in some operational circumstances cache line requests can also come from one or more of the processors of the socket with which the processor interface is associated (e.g., within the same local coherency domain). For example, it is possible that the processor interface 40 can receive a cache line request from one of the processors of the socket 10. Such a request can be represented by the signal 91a of FIG. 2, which then triggers operational behavior by the remote coherent request buffer block 70 similar to that which occurs in response to the receipt of remote cache line requests as discussed above.

Figure 3:
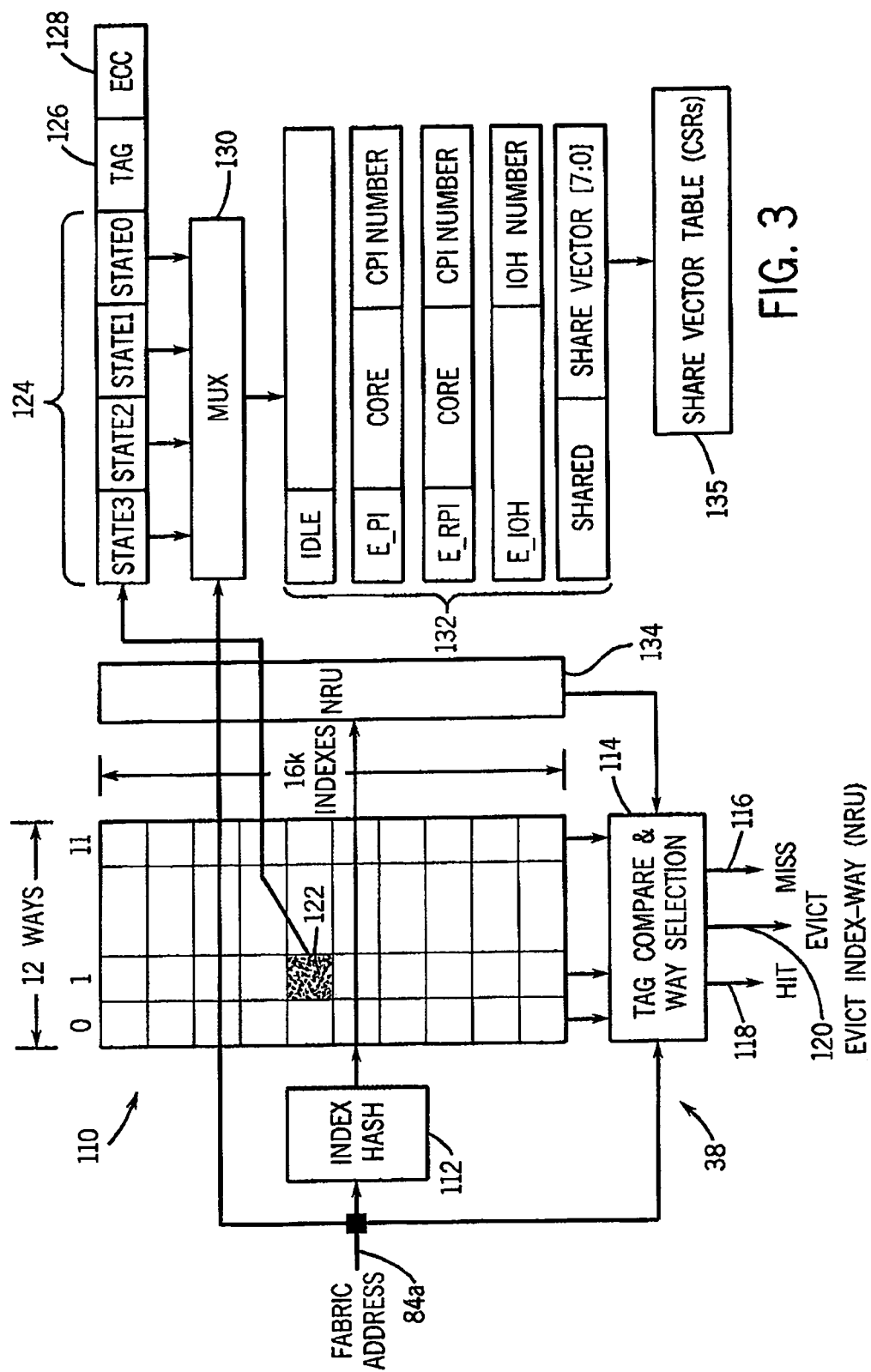
FIG. 3 is a schematic diagram showing an exemplary configuration of a filter tag cache of FIGS. 1 and 2 in accordance with one embodiment of the present invention.

The configuration and operation of the filter tag cache 38 can take a variety of forms depending upon the embodiment. In the present embodiment, the filter tag cache 38 takes a form illustrated by FIG. 3. As shown, the filter tag cache 38 in particular includes a matrix 110 having twelve ways and 16K indexes. Incoming signals (e.g., the signal 84a of FIG. 2) to the filter tag cache 38 that arrive in response to remote cache line requests include both fabric address information and tag information. Upon such a signal (again, for example, the signal 84a) reaching the filter tag cache, the signal is first processed by an index hash table 112 so as to select one of the 16K indexes. Then the tag information is further compared against each of the 12 ways of the filter tag cache entries corresponding to the selected index, at a tag compare and way selection block 114. As discussed above, in any given circumstance it is possible that a requested cache line will not find a corresponding entry in the filter tag cache 38 such that there is a cache miss 116, or that a requested cache line will match a corresponding entry within the filter tag cache so as to result in a hit 118, or that upon the occurrence of a cache line request an eviction will need to occur 120, it being understood that the signal 86a from the filter tag cache can indicate any of these three conditions.

To the extent that the hit 118 occurs, an entry within the filter tag cache 38 such as a tag entry 122 is identified as corresponding to the requested cache line, As shown, in the present embodiment, each entry such as the entry 122 tracks remote ownership of four, consecutive cache lines in main memory. The tag entry 122 includes four state fields 124, a tag field 126, and an error correcting code field 128. The state fields 124 track the cache coherency state for each of the four cache lines, and have the encoding shown in Table 1 below. The tag field 126 records the physical address bits that are not part of the cache index or cache line offset, so a filter cache hit can be determined. Although each tag entry 122 includes four state fields, in response to any given remote cache line request such as that provided by the signal 84a, a single one of the state fields 124 is selected by way of a multiplexer 130, the operation of which is governed based upon the signal 84a. The selected state can at any given time be one of five states 132 as shown in FIG. 2 and also shown in Table 1.

TABLE 1

| Filter Cache Tag State | Description |
| --- | --- |
| Idle | The cache line is not remotely cached. |
| E_P | Exclusive ownership given to a remote coherency domain |
| E_RP | Exclusive ownership given to a remote coherency domain and the processor which has the line belongs to a different partition than the partition as the home |
| E_IOH | Exclusive ownership given to an IOH which belongs to the same partition as the home |
| Shared | Shared by more that one processor core in the same partition as the home. |

More particularly with respect to the available states, the idle state is indicative that the cache line is not currently owned. In contrast, when the state field is E_P or E_RP, the remote domain and the core in the remote domain are stored. This allows the filter cache control block 46 to issue a snoop directly to the processor which has read/write access of the line (e.g., by way of the signal 96 of FIG. 2). The E_RP state allows the filter cache controller to disable high performance C2C optimizations for snooping line out of remote coherency domains that belong to different partitions, thereby simplifying the snoop error handling cases. As for the E_IOH state, when the state field is IOH, the IOH number is stored in the tags. Finally, when the state field is shared, a share vector is also stored in the state field. The mapping of the share vector to a set of remote caches is controlled via a set of Control Status Registers (CSRs) forming a share vector table 135 (which keeps track of who has a read-only copy of the line).

A variety of procedures can be followed by the filter tag cache 38 in selecting which of its tag entries/cache lines should be evicted when (as discussed above) it is necessary for one of the tag entries/cache lines to be evicted in order to make room for new cache line ownership information. In the present embodiment, in such circumstances, a not recently used (NRU) block 134 is consulted by the filter tag cache 38 to determine that one (or more) of the tag entries/cache lines with respect to which a remote cache line request has not occurred for the longest period of time. The NRU block 134 in the present embodiments is formed using single-ported SRAM.

In the embodiment, once a remote processor, for example, the processor in socket 20, has requested a cache line from socket 10, the remote processor stores the cache line in the processor's cache 59, 61. Socket 20 may make intensive use of the data in the cache line without generating any further communication to processor interface 40. Where the cache 59, 61 is a "writeback" cache that writes back changes to a modified cache line only when the modified cache line is evicted, even repeated writes may not be written back to the home memory 34 as they occur. Alternatively, the cache line may be lying idle in the cache 59, 61 of socket 20, without generating any further communication to processor interface 40 until the socket 20 processor reaches a step in its processing at which it explicitly releases the cache line. When the filter tag cache 38 is using an NRU rule to select cache tag entries to evict, it is assumed that it is more efficient to evict cache lines that have not recently been used.

So that the home NRU block 134 can keep track of which remotely owned tag entries/cache lines have not been recently used, the remote request control block 48 of the remote owner 20 issues "downgrade hint" messages to the filter cache control 46 of the home socket 10 for events in the remote caches 59, 61 that indicate a specific cache line is of low importance to the remote user, such as for low level to higher level cache line transitions, and for exclusive to invalid cache state transitions in remote caches. Examples of such events include a writeback from a smaller, lower latency cache to a larger, higher latency cache (implying that the line has been evicted from the lower level cache) or an eviction from a high level cache, the eviction in each case implying that the local cache controller of the remote owner has identified the cache line in question as a not recently used cache line. The filter cache control block 48 in turn updates the bits of the NRU block 134 for the lines that have transitioned, so as to write those lines as being invalid or of low estimated value to the remote owner, for example, by marking them as not recently used. These lines are favored if a new request must evict a non-invalid cache line out of the filter tag cache 38.

If the NRU block 134 contains a single NRU bit for each cache way, then the bit for the way to which the downgrade hint relates is set, and when the filter tag cache 38 needs to free up an entry, any of the eligible ways with its NRU bit set may be chosen. Alternatively, if a Least Recently Used (LRU) block 134 with multiple bits is used, allowing ordering of ways according to how recently they have been used, the way to which the downgrade hint relates is set may be marked as the least recently used way, or set to some other preselected position within the order.

Figure 4:
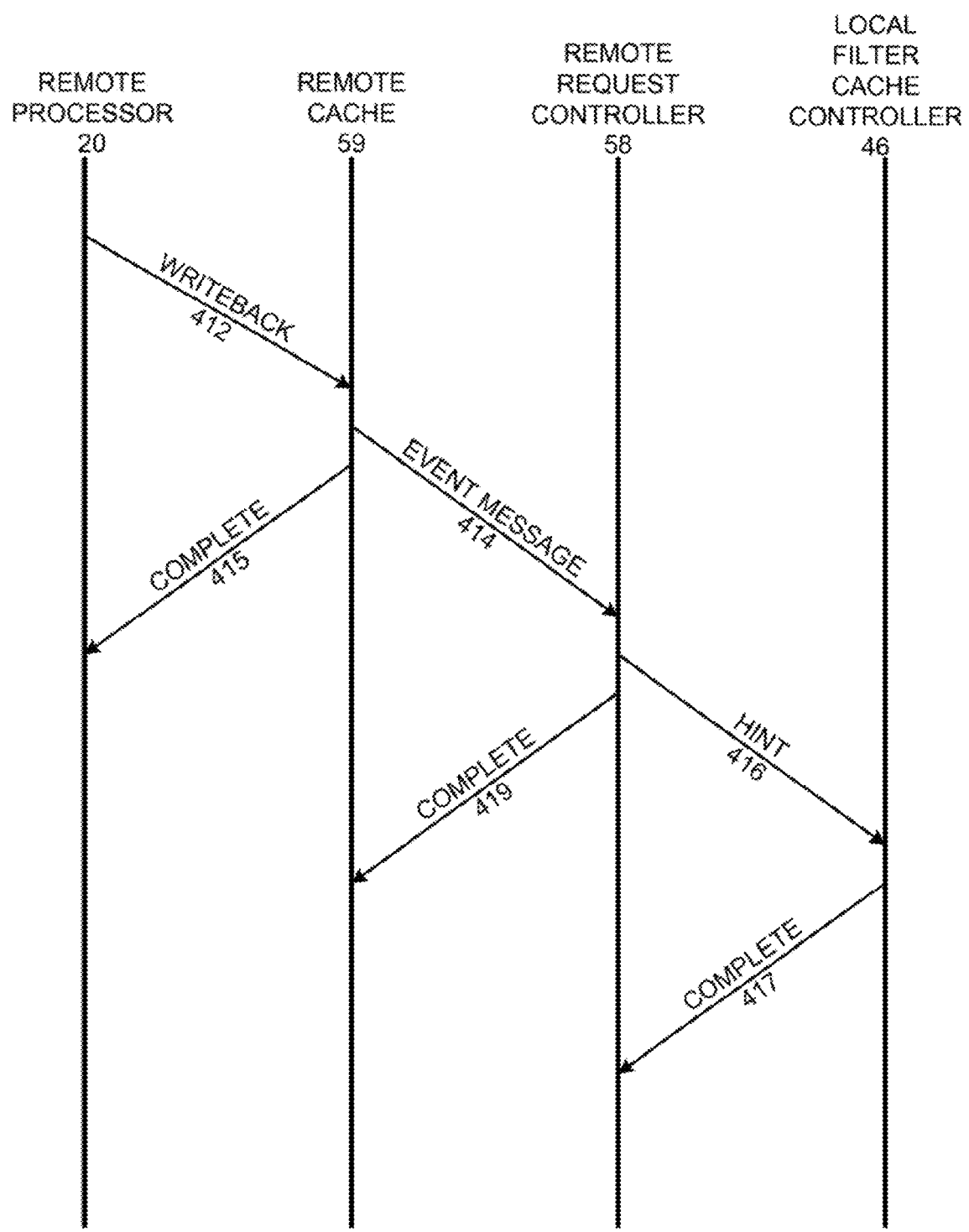
FIG. 4 is a transaction diagram of an exchange of messages in accordance with an embodiment of the invention.

Referring now to FIG. 4, in an example of a downgrade hint transaction a processor core, for example, on socket 20, owns a cache line of data from main memory RAM 34 on socket 10. The ownership is recorded in filter tag cache 38 of processor interface 40 associated with socket 10, and the data is in caches 59, 61 of processor interface 50 and socket 20.

In a first step, a notifiable event 412, such as a writeback to the highest level cache 59 or the surrender by the processor of a cache line that is then retained in the highest level cache 59, is detected by the highest level cache 59. The highest level cache 59 sends a message 414 to the remote request controller 58, and returns a complete message 415 to the originating processor 20. In a second step, the remote request controller 58 sends a Downgrade Importance Hint 416 over the fabric 8 to the filter cache controller 46 of the home socket 10. The hint contains an identification of the cache line in question, typically in the form of the physical address of the underlying entry in main memory 34, and an indication that the message is a Downgrade Importance Hint. In an embodiment, the Hint contains a Request Type identifying the specific type as a Downgrade Importance Hint, a Transaction ID, and the Source and Destination Processor Interface IDs. The Transaction ID is provided because a Request expects a response, to which it can be matched by the Transaction ID. The Destination Processor Interface ID is used by the fabric 8 for routing of the message. The Source Processor Interface ID is used for routing of the response, and may also be used by the recipient filter cache controller 46 to verify the Hint in fact comes from the owner of the cache line to which it refers.

On receiving the Hint, the filter cache controller 46 passes it to the filter tag cache 38, which alters the NRU 134 to show the cache line in question as not recently used. The filter cache controller 46 then sends a message 417 of Response type with the matching Transaction ID back to the remote request controller 58 to confirm that the Hint has been received and processed. The Response message 417 contains no payload. In the context, the fact that an empty message with the correct Transaction ID is sent is sufficient. The remote request controller 58 similarly sends a confirmation message 419 to the cache 59, either after sending the hint 416 or after receiving the confirmation 417.

Because the downgrade hints do not require immediate action or response, but are merely informational, they are not urgent. Indeed, the only consequence of omitting a downgrade hint is a possible loss of efficiency at some future time. The remote request control 58 may therefore monitor traffic levels on the global interconnect 8, and defer, or even discard, downgrade hints if there is not sufficient available bandwidth to send the hints without hindering more important traffic.

Due to the use of the NRU block 134 in this manner, in the present embodiment different types of cache line requests are classified in two pools (e.g., an "A" pool and a "B" pool). The A pool requests are requests in which updating of the NRU block 134 is required, while the B pool requests are requests in which no updating of the NRU block is needed. Since in the present embodiment the NRU block 134 is formed from single-ported SRAM, the A pool requests involving the NRU block can only be issued every other clock cycle, while the B pool requests not involving the NRU block can be issued every cycle (consecutive cycles). The restriction upon the A pool requests in particular frees up SRAM access cycles for NRU write operation, and also results in a situation in which a given read request issued to the filter cache control block 46 in any given cycle N does not have to perform conflict checking against read requests issued to the pipeline in a previous cycle N−1. Notwithstanding the above description, it should be further noted that if multi-ported SRAM is utilized for the NRU block 134, the restriction upon the A pool requests is no longer needed. Further, although the present embodiment envisions the use of the NRU block 134 in determining which tag entries/cache lines are to be evicted, in alternate embodiments, instead of utilizing an NRU block, the determination as to which tag entry/cache line should be evicted is made based upon another algorithm (e.g., first-in, first-out) or randomly.

In an embodiment, operation of the filter tag cache 38 and NRU 134 depends upon the operation of one or more additional memory caches, and which may include memory caches 49, 51, 59, 61 shown in FIG. 1. In such an embodiment, each memory cache 49, 51, 59, 61 is a SRAM-implemented cache that can be implemented in conjunction with (or even as part of) the respective filter tag cache (e.g., the filter tag caches 38, 68) that is associated with the given socket. In some embodiments these memory caches can be level 4 (L4) cache 49, 59, level 3 (L3) cache 51, 61, or other types of caches. The memory caches in particular can serve a significant intermediate role in facilitating the operation of the sockets (processors) with which they are associated in terms of their interactions with remote home agent filter tag caches associated with other sockets, in terms of influencing how those home agent filter tag caches assign ownership to their associated memory locations, and particularly in terms of how evictions from the NRUs of those home agent filter tag caches are performed.

This role of the memory caches can be illustrated by considering the operation of the memory cache 59 of processor interface 54 in relation to the filter tag cache 38 of processor interface 40 with respect to a memory location in the memory block 34, with respect to which the filter tag cache 38 is the home agent filter tag cache. For example, suppose that a processor within the socket 24 associated with the processor interface 54 has ownership of a given memory location in the memory block 34. At some point in time, that processor may decide unilaterally to "give up" ownership of that memory location. In the absence of a memory cache, the processor could directly notify the home agent filter tag cache for that memory location (namely, the filter tag cache 38) such that, in response, the filter tag cache no longer listed that processor of the socket 24 as the owner of the memory location. However, given the presence of the memory cache 39, the processor instead notifies the memory cache that it is giving up ownership of the memory location, but does not explicitly command the memory line to be written back and released to main memory 34.

When this occurs, the memory cache 59 in response, rather than notifying the filter tag cache 38 of the change in ownership, instead tentatively continues to store a copy of the memory location such that the information remains accessible to the processor of the socket 24 if the processor should need that information. At the same time, however, the memory cache 59 also provides a "downgrade hint" to the NRU 134 of the filter tag cache 38 making it appear that the memory location (cache line) has not been recently used. As a result, if at a later time it becomes necessary for the filter tag cache 38 to evict one of its entries as discussed above, the entry associated with the memory location stored by the memory cache 39 is evicted first, or sooner than other entries. Upon the eviction notice being sent out, the memory cache 59 relinquishes control of the memory location (rather than the processor of the socket 24 doing so). By operating in this manner, the socket 24 by way of the memory cache 59 effectively retains low-latency access to the information stored in the memory location for a longer period of time than would otherwise be possible, and yet this does not limit others' access to that memory location.

In view of the above discussion, it should be evident that at least some embodiments of the presently-described home agent filter cache architecture have one or more of the following features, characteristics and advantages. First, in at least some embodiments the architecture enables the overall computer system 1 to be scalable to larger numbers of processors/sockets (e.g., up to 64 sockets or possibly even more sockets) and IOHs, particularly as are employed in multi-processor systems built with processor sockets with on-chip memory controllers. Such scaling can be achieved by bridging together multiple cache coherency domains by recording remote cache line ownership in an inclusive filter tag cache. Also, in at least some embodiments, the architecture allows for local requests by processors (e.g., within the local coherency domain) to be performed directly via the on-chip memory controllers associated with those processors without the accessing of any external devices, thereby reducing the best case cache miss latency and improving system performance.

Further, in at least some embodiments the architecture records remote core information in the filter cache tags. Consequently, when remote coherency domains need to be snooped, only the remote core that has exclusive ownership needs to be snooped to recall exclusive ownership, thereby reducing latency and increasing system performance. Additionally, in at least some embodiments the architecture records partition information in the filter tag cache so that cache coherency between partitions can utilize a different (and more fault tolerant) cache coherency protocol than the protocol used for maintaining coherency between processors in the same partition. Further, remote accesses that are hits in the filter tag cache achieve better latency than in conventional systems, since the old owner can be determined after a filter cache access rather than a DRAM access (this once again reduces cache miss latency). Also, in at least some embodiments the present architecture performs conflict checking using the filter cache control block (which also can be referred to as a filter cache tag pipeline) so the tags can be realized in a single ported memory structure which takes several cycles to access.

Further, in at least some embodiments, the architecture performs an address translation between a local and a global address to allow more flexibility with interleaving. Additionally, in at least some embodiments, the architecture performs access checks to allow remote partitions to only access authorized addresses. Further, in at least some embodiments, the architecture uses a cache tag format that groups consecutive cache lines into bundles, so as to amortize the cost of the cache tag field across multiple cache lines, thereby reducing the size of the filter tag cache. Additionally, in at least some embodiments, the architecture utilizes remote cache exclusive to invalid notification requests to remove lines from the filter tag cache, to reduce frequency of back invalidates caused by filter cache replacements, and to thereby increase system performance. Finally, in at least some embodiments, the architecture utilizes a remote cache lower level to high level cache transfer requests to update the filter cache's NRU block bits to favor replacement of lines that reside in the highest level cache.

It is specifically intended that the present invention not be limited to the embodiments and illustrations contained herein, but include modified forms of those embodiments including portions of the embodiments and combinations of elements of different embodiments as come within the scope of the following claims.

For example, in the embodiments the filter tag cache 38, 68 stores cache tag data, but is not actually attached to a data cache. The filter tag cache 38, 68 serves as a supplement to a data cache or tag cache associated with main memory 34, 36, storing detailed information about remote ownership of cache lines that the main memory cache does not store. Alternatively, however, the filter tag cache 38, 68 could be accompanied by a cache for which the filter tag cache serves as the tag storage.

In the embodiments, the highest level cache 102 (which may be an L4 cache) is part of the processor interface 40, 50, etc. and the lower level caches 104 (which may be L1 to L3 caches) are part of the processor socket and main memory unit 10, 34, etc. The events that trigger the generation of hint transactions are events involving the L4 cache 59. With this arrangement, the processor interface 40, 50 can contain all the logic involved in generating and handling hints. The remainder of the cells 4, 6, including the L1-L3 caches 61, may be of a sort chosen for other reasons, including a conventional sort. Other arrangements are possible. For example, hints may be generated in response to events at levels below the highest level cache, or for different events at different levels. In many cases, however, a simple arrangement is likely to offer the greatest overall benefit.

We claim:

1. A multiprocessor computer system comprising:
a host coherency domain including host main memory;
a client coherency domain including,
   a client processor capable of accessing said host main memory, and
   a client cache device operative to store accesses by said client processor to said host main memory;
said host coherency domain including a host filter tag cache device associated with said host main memory, said host filter tag cache device being operative to store information identifying ownership of data in said host main memory including ownership by coherency domains other than said host coherency domain, said host filter tag cache device being operative to selectively invalidate host filter tag cache entries when space is required in said host filter tag cache device for new cache entries;
wherein said client cache device is configured to respond to an event indicating that a client cache entry has low value to said client processor by sending a downgrade-importance hint to said host filter tag cache device; and
wherein said host filter tag cache device is configured to respond to receipt of said downgrade-importance hint by storing an indication that said entry has a low value to said client processor, said host filter tag cache device being adapted for selecting a filter tag cache entry marked as having a low value to said client processor to invalidate in favor of a client filter tag cache entry not marked as having a low value to said client processor or other remote processor that is remote with respect to said client coherency domain.

2. The system of claim 1, which is a partitioned computer system, wherein said host main memory and said host filter tag cache device are in a host partition, said client processor and said client cache device are in an client partition, said system further comprising a fabric adapted for connecting said host partition and client partition.

3. The system of claim 1, wherein said client cache device is a multi-level write-back cache, said event being a write-back from a lower to a higher level of said remote cache device to send said downgrade-importance hint to said host filter tag cache device.

4. The system of claim 1, wherein said event includes a surrender by said client processor of a cache line that is retained in said client cache device to send said downgrade-importance hint to said host filter tag cache device.

5. The system of claim 1, wherein said client cache device is adapted to respond to usage on a communication link to said host filter tag cache device by issuing downgrade-importance hints only if sufficient free bandwidth is available to communicate said downgrade-importance hints without hindering other traffic.

6. The system of claim 1, wherein said host filter tag cache device is adapted for selecting entries to invalidate or downgrade based at least in part upon a relative usage of cache entries, and is adapted to respond to said downgrade-importance hint to change a recorded usage status of an associated cache entry.

7. A system comprising a client cache device operable to communicate with a host device over an inter-coherency-domain communications link and to cooperate with a client processor, said client cache device being operative to receive from said host device and to store in said client cache device cache data requested by said client processor;
wherein said client cache device is responsive to events indicating that an entry in said client cache has low value to said client processor to send a downgrade-importance hint to said host device.

8. The system of claim 7, wherein said client cache device is a multi-level write-back cache, and said events include a write-back to a highest level of said client cache device.

9. The system of claim 7, wherein said events comprise the eviction of an entry from said client cache device.

10. The system of claim 7, wherein said client cache device is adapted to respond to usage on said inter-coherency-domain communication link to said host device by issuing said downgrade-importance hints only if sufficient free bandwidth is available on said inter-coherency-domain communication link to communicate said downgrade-importance hints without hindering other traffic.

11. A host filter tag cache operable to communicate with client devices over an inter-coherency-domain communications link and to cooperate with a host memory, said host filter tag cache comprising:
tag cache memory operative to store information relating to cache lines requested by said client devices from said host memory; and
control logic operative to selectively invalidate filter tag cache entries when space is required in said filter tag cache memory for new cache entries, said control logic including logic operative to estimate a relative value of cache lines to which said filter tag cache entries relate and to select preferentially for invalidation cache lines of relatively low estimated value;
said control logic being operative to receive from a client device a downgrade-importance hint relating to a cache line owned by said client device, and to reduce an estimated value of the cache line to which the downgrade-importance hint relates.

12. The filter tag cache of claim 11, wherein said control logic estimates relative values of cache lines based at least in part upon a relative usage of the cache lines, and adapted to respond to a said downgrade-importance hint to change a recorded usage status of the cache line to which the downgrade-importance hint relates.

13. A system comprising a host coherency domain including a host processor, host main memory, and a host filter tag cache for storing host tag entries, said host coherency domain being adapted for receiving from a client coherency domain a downgrade-importance signal that identifies a tag entry in said host filter tag cache, said host coherency domain being adapted for responding to receipt of said downgrade-importance signal by storing low-importance indication that cached data stored by said client coherency domain and associated with said tag entry is of relatively low-importance to said client coherency domain.

14. A system as recited in claim 13 wherein said host coherency domain is adapted for evicting a tag entry in said host filter tag cache having an associated low-importance indication rather than evicting a tag entry not associated with a low-importance indication.

15. A system as recited in claim 13 further comprising said client coherency domain, said client coherency domain being adapted for responding to events indicating a cache entry has low value to said client coherency domain by transmitting said downgrade-importance hint to said host coherency domain.

16. A system as recited in claim 14 wherein said client coherency domain includes a client cache, said events including a write-back a cache entry from said client cache.

17. A system as recited in claim 14 wherein said client coherency domain includes a client processor and client cache, said events including an eviction by said processor of a cache entry from said client cache.

18. A process comprising:
   writing back by a client coherency domain of a subject cache entry from a client cache of said client coherency domain; and
   in response to said writing back, transmitting a downgrade-importance hint to a host coherency domain, said host coherency domain hosting a host main memory having source data, said subject cache entry being a modified or unmodified copy of said source data, said downgrade-importance hint indicating that said subject cache entry is of low value to said client coherency domain.

19. A process as recited in claim 18 further comprising, in response to receipt of said downgrade-importance hint, storing by said host coherency-domain of a low-performance indication that said subject cache entry is a low-performance value to said client coherency domain.

20. A process as recited in claim 19 further comprising making room for a candidate tag entry for a host filter tag cache of said host coherency domain by evicting an existing cache-tag entry from said host filter tag cache, said existing cache-tag entry being selected based on the presence or absence of a low-performance indication corresponding to said existing tag entry.

* * * * *

UNITED STATES PATENT AND TRADEMARK OFFICE
CERTIFICATE OF CORRECTION

| | | |
|---|---|---|
| PATENT NO. | : 8,539,164 B2 | Page 1 of 1 |
| APPLICATION NO. | : 12/244700 | |
| DATED | : September 17, 2013 | |
| INVENTOR(S) | : Craig Warner et al. | |

It is certified that error appears in the above-identified patent and that said Letters Patent is hereby corrected as shown below:

In the Claims

In column 16, line 56, in Claim 13, delete "storing" and insert -- storing a --, therefor.

Signed and Sealed this
Third Day of December, 2013

Margaret A. Focarino
*Commissioner for Patents of the United States Patent and Trademark Office*